UNITED STATES PATENT OFFICE.

MICHAEL A. POPKESS, OF NEW YORK, N. Y.

PLASTIC COMPOSITION AND METHOD OF MAKING THE SAME.

1,240,253.  Specification of Letters Patent.  Patented Sept. 18, 1917.

No Drawing.  Application filed December 13, 1916.  Serial No. 136,808.

*To all whom it may concern:*

Be it known that I, MICHAEL A. POPKESS, a citizen of the United States, residing at New York, in the county of New York and State of New York, have invented certain new and useful Improvements in Plastic Compositions and Methods of Making the Same, of which the following is a specification.

This invention relates to plastic compositions and methods of making the same; and it comprises a process of producing plastic compositions suitable for paving and other purposes wherein a natural soil or earth containing clay is worked or disintegrated with asphalt in the presence of sufficient water to make a fluid mixture until the clay takes up the asphalt, the amount of such asphalt being merely that which will ultimately give a hard and dense composition with clay, (or earth containing the same) although enough to thoroughly impregnate the earthy material, and the amount of water being sufficient to render the whole mixture freely workable; all as more fully hereinafter set forth and as claimed.

In the ordinary asphalt compositions, the asphalt is only a cement; a means for holding permanently in position a mineral aggregate of broken rock or gravel and sand. The mineral matters are chosen of such varying sizes as to occupy as much as possible of the space available, or in other words, to "fill the voids" as nearly as may be; and thereby produce a mechanically stable arrangement, or one of "inherent stability" in which the parts fit together in mechanical or locking engagement. The office of the asphalt is to cement together meeting faces and, for the sake of waterproofing, to fill such cavities as may unavoidably be left. Plasticity of the main body of the pavement, in the sense of any freedom of movement or deformability, is neither present nor desired.

In the present invention, I depart from this type of composition and employ another in which true plasticity obtains; making a composition which is malleable and may be given different shapes by impact or pressure. For strength, that is resistance to traffic and the like, I rely upon stiffness of the composition itself and not upon any mechanical arrangement of contained mineral matters. In other words I make a plastic composition which while sufficiently yielding or malleable to permit shaping, is nevertheless sufficiently stiff to stand up against the ordinary stresses to which it will be subjected in use.

As initial materials, I employ clay and asphalts. Instead of clay, I may use any ordinary soil or earth containing clay; the final results differing in so far as the presence of non-clayey materials such as sand, gravel, rock fragments, etc., may cause a difference in the consistence of the final material. For the present purposes, these non-clayey materials are inert; they are simply fillers in the present composition. For paving and other purposes they may be useful as saving in expense of asphalt, and, where their proportion is not too large, they do not materially change the advantageous properties of the present composition stated. As long as their amount is not too great the yielding, or plasticity, for practical purposes of the composition is not disturbed. Not being in mutual contact to any extent, they do not give the stiff locking engagement of the aggregate of the ordinary concrete-like paving composition.

As the asphalt component of the mixture, I may use any of the compositions now on the market under the name of liquid asphalt. In part, these compositions are residues from the distillation of what are known as asphalt base petroleums, such as those found in Texas, Mexico, California and the mid-continent field. Some of these still residues are sometimes blown or oxidized with air to increase the amount of asphalt present. Some varieties of liquid asphalt are found naturally as what are called mineral tars. I may of course use artificial liquid preparations made in a wide variety of ways; as by fluxing the harder asphalts with non-volatile mineral oils or with specially prepared fluxes. Whatever the material used in liquid form it should be free of bodies volatilizing on exposure to air, for reasons later appearing.

In a general way it may be said that the softer and thinner the liquid asphalt that can be used the longer is the life of a paving composition. Asphalts harden in time and the softer the original consistency the longer, of course, is the time before undue hardening occurs. Further with the soft asphalts, when properly prepared, as a rule, there is a less difference in consistency between the extremes of winter cold and summer heat than with the hard varieties of asphalt—something which is very desirable in paving. The ideal asphalt composition should mark and give a footing for horses and retain a more or less yielding quality in winter.

The water of adsorption, as it may be called for the sake of a name, which gives the clay its plasticity, can be driven off by gentle heating, but the clay then becomes "flocculated," and the association of the particles with each other no longer is the same as in the original moist plastic clay, though this original relation may be brought back by remoistening. The amount of adsorbed water necessary to give a strong dense plastic and malleable composition with dry clay varies, but is generally around 18 to 20 per cent. With the right amount the clay and water form a homogeneous composition which has the general properties which are known as colloid. The ultimate particles together with the adsorbed water may be regarded as what are known as "swollen colloids."

Although plastic, malleable and deformable, nevertheless clay in the state just described has considerable strength; that is resistance against deformation or stiffness. A good "dirt road" with the right amount of moisture (a condition which unfortunately is transitory) withstands heavy traffic.

It is an object of the present invention to produce a plastic material suitable for paving and other purposes, which shall resemble good clay with the right amount of water as regards malleability and other advantageous properties but shall be permanent and shall be very much stronger, that is, stiffer, tougher and more tenacious. And to this end, advantage is taken of the property of asphalts in the liquid form of displacing the adsorbed water of plastic clay.

The ultimate composition which I wish to produce for paving and other purposes is composed, without considering any filler that may be admixed therewith, of clayey substance and liquid asphalt, the relative proportions of the two being such as to give a hard, dense, malleable composition which is yet sufficiently stiff to withstand the heavy strains incident to traffic on a road surfaced with such material. Such proportions must be in predetermined quantities and absolutely correct and are preferably obtained by measuring or weighing the ingredients before being mixed in a vessel or machine. But where clayey material is incorporated with a liquid asphalt in such proportions without the presence of anything to aid incorporation, obviously the mechanical work necessary to produce homogeneous incorporation is excessive; the mixture, as it approaches completeness, resists disintegration, etc., with as much force as the final pavement would withstand traffic. In the present invention I therefore use water as a facilitating agent in incorporation; I not only displace the adsorbed water of the clay by asphalt but I use as much more water as may be necessary to secure easy working.

I have found that where water and liquid asphalt are simultaneously mixed, as an emulsion or otherwise, with moist clayey material, that as the mixing incorporation proceeds the asphalt is taken up by the clay. But such a mixture, since after all it contains two fluids, is plastic and readily worked. In this working all clods, balls, etc., containing unmixed earth should be broken up, and fine disintegration is necessary.

Apparatus should be used giving as fine and positive a disintegration of the material as possible, as this much hastens and accelerates the action. Ordinarily I place predetermined amounts of wet earthy material and of asphalt in a suitable vessel and agitate the two in such a manner as to produce very fine disintegration. Any emulsifying machine or process may be used.

I have found that if I take clay in the form of a soft mud, or even with so much water as to make it sloppy, and work in the exact amount of any liquid asphalt which, with the amount of dry clay present, will ultimately produce a hard, and for the present purposes, sufficiently strong paving material, the mixture will, because of the presence of the water, disintegrate, knead and work readily. As the mechanical mixing goes on the asphalt clings to and permeates the clay while the water is displaced from immediate contact therewith. At the end of the operation I have a material varying from a more or less plastic open-textured material containing water in its pores to a sloppy mixture. This material I may now use directly, applying it to a road. Under the influence of evaporation and traffic the pores and voids gradually close with removal and expulsion of the contained water. As the water leaves, the material becomes more and more dense by obliteration of pores until finally a hard, dense, malleable roadway is produced of the properties described. It is stiff enough to stand up under traffic. Any wheel or horse markings or the like, which may form under traffic will heal under the compacting action of traffic. But as natural evaporation under the influence of the sun is not always to be relied upon and is slow, I advantageously after incorporation sufficiently to make the mixture, so far as the bitumen and the clay are concerned homogeneous, heat somewhat while continuing the working. In hot working the material, the water evaporates and I ultimately obtain a dry material. Under the influence of heat the asphalt of course becomes considerably thinner and the mixture, which when cold is stiff, nevertheless can be worked while hot with some degree of ease.

While I have more specifically described hereinbefore the treatment of clay or soils which are mainly clay, I wish it to be understood that the same process is applicable to soils containing moderate or even considerable amounts of sand, gravel, rock fragments, etc.; and such materials may even be advantageous for the present purposes for the reason that in so far as these other bodies occur asphalt is economized. So long as they do not form too large a part of the composition I do not obtain the ordinary type of "stable aggregate"; all such "fillers" being substantially spaced and isolated in the main composition of clay and asphalt; the clay-asphalt mixture forming the main wear resisting and traffic supporting material.

The invention so far described gives a material which is complete and ready for application, needing only, in some cases, drying. The material after the incorporation of the clay with the liquid asphalt as finished is homogeneous; a microscopical examination of the clay-asphalt composition will not show distinct layers or segregations of asphalt or of clay. This material is produced with asphalts which are liquid at ordinary temperatures.

In a modification of my invention I can use asphalts which are normally solid or simi-solid at ordinary temperatures, retaining however the advantage of working at the ordinary temperature in the presence of a comparatively large body of water as what may be called an emulsifying, deflocculating and lubricating fluid.

If a solid asphalt be heated up to the temperature at which it becomes liquid and then be introduced into water with simultaneous vigorous agitation it becomes very finely subdivided; virtually forming an emulsion with the water. It does not necessarily contain solid particles even where the asphalt is high melting and the water is at normal temperature for the reason that the asphalts may be cooled for a time below their normal solidifying point without losing liquidity.

What will happen with the liquid asphalt and water will of course happen with a mud; that is, clayey material stirred up with water. But in this case the fine particles of asphalt produced in the emulsification and suspended in the water tend to cling to the fine clay particles; this being true whether the asphalt particles are solid or liquid. And the result of stirring up hot liquid asphalt with a paste, mud or slurry of clay and water is to produce a material in which clay and asphalt are associated. This association may be of solid particles or it may be of liquid asphalt particles with solid clay particles. In either event the finely divided mixture after removal of the water, which may be effected in any way as by settling and draining, pressing, drying, etc., consists of associated particles of clay and of asphalt. If this material be now heated the asphalt, if not already liquid, becomes liquid, and penetrates the particles; if it be already liquid, heating causes it to become more liquid and to penetrate quicker. I may therefore produce the emulsion in the manner just described, separate it from the bulk of the water and thereafter heat to cause penetration and to remove the excess of water. The material is now, like that made with the liquid asphalts, finished in the sense that it is made homogeneous. Or I may take the wet mud of associated asphalt and clay and put it directly on the highway. After a time the water will evaporate, and as asphalt, even though apparently solid at ordinary temperatures, is after all a fluent material, in the course of time the asphalt particles will penetrate the clay particles, making a homogeneous mixture. The only disadvantage about this last procedure is that the material on the roadway requires time to, so to speak, age and to form the finished material.

I find however it much more advantageous to dry the material artificially and to use the normally liquid asphalt for the reasons that it is quicker and more positive to dry the material and apply it in a dry condition. The advantage of the liquid asphalt is that stated *ante:* the greater life of the liquid asphalts and the fact that weather changes have less influence on their consistence. As stated, where I use in the present invention liquid asphalts they should be free from materials volatile on exposure to air. This is for a number of reasons. One is that I wish to adjust accurately the relations between the amount of earthy material and the amount of asphalt in making my pavement and to secure an exact relation between the two at the time when the pavement is made. In the presence of any thing which is volatile in the air in the pavement the volume of the asphalt impregnating the earthy material naturally diminishes in time and the consistency of the composition changes. And with volatile bodies present the material becomes much more liquid under the heat of the sun than is otherwise the case and on a hot day such an asphaltic composition, in the presence of these materials, may become so liquid as to move relative to the earthy matter, thereby destroying my preadjusted relations. It is found that with liquid asphalts containing anything that is volatile under atmospheric conditions, in practising the present process the pavement is not permanent; it develops ruts, waves, undulations, etc. And the asphalt after the oil has volatilized tends to harden quicker than where it is used in the absence of non-volatile hydrocarbons.

The amount of asphaltic composition needed for any given soil depends considerably upon the composition of that soil; and to some extent upon the fluidity of the asphalt. In calculating the amount the stone, gravel and sand may, to some extent, be disregarded and an amount of asphalt used with the clay present which will give in the clay-asphalt mixture about 80 to 85 per cent. of clay and 20 to 15 per cent. of asphalt.

In Patent No. 1,008,433, I have described and claimed a material which, like the present material, is composed substantially of clay, or clay material, and asphalt; but the material of the patent is made by incorporating dry dust with a hot liquid asphalt. In another and copending application 90,391, filed April 11, 1916, whereof the present is in part a continuation, I have described and claimed broadly the production of permanent plastic compositions suitable for paving and the like wherein the moisture of clayey material is displaced by asphalt with the production of a final material differing from plastic clay in that for the moisture of plastic clay I have substituted asphalt. In the specific embodiment of my invention, however, described and claimed in said application, the incorporation of the clay and the asphalt in the presence of moisture is done with the materials sufficiently warm to permit the use of a normally solid asphalt; the purpose of the specific invention therein described and claimed being the production of a road material in which the clay particles are permeated and united by asphalt solid at normal temperatures. And in the specific embodiment of said prior application the moisture present in making the composition is, or may be, merely that which is necessary to preserve the natural deflocculated character of the clay during the incorporation. In the present specific invention I employ much more water, performing the incorporation of asphalt and clay in the presence of enough water to make the whole material freely plastic and workable at the ordinary temperature; the water having here the function of a lubricating and admixture-promoting fluid.

The asphalts employed in the present specific invention should be, like the asphalts of said copending application, substantially pure asphalts; that is, substantially free of anything volatile under atmospheric conditions; and in the most advantageous embodiment of the present invention they are of liquid character. In the present invention I may use the harder asphalts also, but in so doing the action is, as with the liquid asphalts, virtually the employment of an emulsion of water and asphalt. In all embodiments the amount of asphalt is so chosen that the final material will have merely enough asphalt to make it the described hard, tough, stiff but malleable composition suitable for paving and like purposes.

Pavements made under the present specific invention with liquid asphalt are somewhat better adapted for cold climates than those made with the harder asphalts normally solid at ordinary temperature for the reason that they preserve their malleability and rubbery character in cold weather; they will "mark under traffic" even below 32° F.; which is an ideal characteristic of an asphalt pavement and one which is not readily secured with the usual mechanical interlocked assemblage of mineral aggregate and cementing binder unless the same be surfaced with soft material in which case it will displace and fail in hot weather. At the same time, paving compositions made with the liquid asphalt under the present invention, since the amount of liquid asphalt is restricted to that which will make a substantially "dry" composition even under summer heat, do not become too soft. Many liquid asphalts become rather thin at temperatures reached by pavements exposed to the sun; but since in the present composition there is merely enough asphalt to be taken up by the earthy matter there is not enough to form any free liquid and allow the pavement to yield, rut and wave.

In order to secure the stated results the relative amounts of earthy matter and of asphalt must be quite accurately established. Any excess of earthy matter gives a pavement which will break down and disintegrate, the unimpregnated portions exercising a grinding action on the rest; while any excess of bituminous composition gives a pavement which ruts and is not permanent. The amount of asphalt necessary of course varies somewhat with each particular kind and with each particular soil, but in each case there is a best proportion which should be established and maintained.

The particular apparatus used is not very material as long as there are means for accurately weighing or measuring the asphalt and the soil and for energetic disintegrating, and incorporation, of the mixture. If the amount of water used is rather small, maceration, cutting, kneading, etc., may be used; if the amount is larger, ordinary mechanical stirring by stirring blades, air jets, steam jets, etc., may be employed.

While as stated, in using normally liquid asphalts I may use any variety of this material found in commerce, provided it is substantially free of volatile or greasy hydrocarbons of lubricating nature, yet I find it most advantageous to employ liquid bitumens which are as little as may be changed or altered from the state in which they are found in nature. High heating, such as is necessary in making asphalts from many asphalt-base petroleums, and oxidation, such as occurs in making blown oil bitumens, both set up internal changes which appear to be progressive. At all events pavements made with these asphalts are not as enduring or lasting as those made with bitumens in which manufacturing conditions are not so violent. For a lasting waterproof pavement I find it advantageous to use a liquid asphalt in as near as possible to its natural condition or the equivalent materials; the native oils which are so asphaltic that a simple distillation, such as "topping", or even evaporation is sufficient to remove volatile and greasy hydrocarbons. Certain Mexican oils are, for instance, so asphaltic, that they merely need a slight heating to give a liquid asphalt of exceptionally long life in the pavement. Apparently, the nearer the conditions under which an asphalt can be used in a pavement approach the condition under which it is found in nature, the less it is subject to oxidation and degenerative changes. Also, these "natural" asphalts, as stated, show less variation in consistency under temperature changes.

From results obtained with various asphalts it appears that for some reason, physical or chemical, or both, clayey matter tends to preserve asphalt against degenerative changes; and any asphalt compounded with earthy material, as herein described, is longer lived than when used with sand, gravel, rock, etc., in the ordinary ways of making pavements. This longer life in the presence of clay is even more pronounced with the liquid asphalt.

The liquid asphalts or bitumens the use of which is specifically contemplated in the present invention are not ordinarily regarded as useful in paving work. For paving work the solid or semi-solid asphalts are ordinarily used, and if the liquid asphalts are substituted for them, other conditions remaining the same, the pavement waves or fails in warm weather. This is for the reason that the liquid asphalt on warming up becomes a lubricating rather than a cementing fluid; promoting relative movement of the mineral aggregate rather than restraining it. In the present invention however since the amount of liquid asphalt and the manner of incorporation with the mineral matter are so chosen that the mixture is substantially dry, the composition is "non-flowing"; hot weather does not injure or destroy the pavement. The present invention makes useful softer asphalts than are customarily used; and the softness may be so great as to give an asphalt liquid at ordinary temperature.

Since the composition produced under the present invention is non-flowing it may be used in making pavements of the ordinary type; being there used to fill the voids and cement the aggregate together. But as it is itself adapted for making the wear resisting surface of the road, the use of the assembled aggregate of the usual character is usually an unnecessary complication and expense. The composition of the present invention is one which can be tamped into place to give a sufficiently hard, durable, dense, non-flowing, impervious, waterproof surface, and its malleability and general properties give a pavement of a better character than can be obtained with built-up aggregates.

Liquid asphalts, as stated, have not been heretofore regarded as useful alone in making pavements although they have been used in admixture with hard asphalts. But I find that used in the manner indicated under the present invention they give a highly desirable type of pavement; they give a pavement which, unlike all prior asphalt pavements, retains its desirable properties in the coldest weather; which is malleable in freezing weather. And the ease and cheapness with which a pavement may be manufactured by their use under the present invention is obvious. Any soil may be used and the surfacing composition of the roadway manufactured near the point at which it is to be used. I do not manufacture the composition in place on the surface of the road because, as stated, accurate predetermined ratios between the amount of earthy matter and that of bitumen must be established and maintained and this obviously is not possible in the case of soil in place. And the necessary intimate and uniform incorporation of soil and asphalt, with substantial homogeneity of the mixture, cannot be obtained by direct application of the asphalt to the soil in place, even if thinning volatile oils are employed; an employment which for reasons stated *ante* I regard as in any event highly disadvantageous. The composition may be made, near the point of application, from neighboring soil. And the operation is virtually that of making a mud with the water and the asphalt, while the only heating which is used is that involved in a final drying of the material. Even this may be omitted, although it is quicker to use heat for finishing the material. The amount of energy required in disintegrating the mixture, and particularly where it is made rather thin by the use of plenty of water, is very little.

And, as stated, the roadway is of exceptionally long life.

Because of the comparatively rigid character of the ordinary built-up asphalt pavements and their frangibility, a hard and unyielding foundation of concrete or the like is ordinarily necessary in making a lasting pavement. No such necessity occurs with the present material; the characteristics of the material of this invention allow it to be used successfully even on a dirt foundation or a preëxisting roadway. Being malleable and retaining this characteristic in winter cold, it does not crack under vibration and there is no necessity for as rigid a foundation as in the usual types of roadway. Where no special foundation is used and the pavement is placed on the surface of the earth, care should, however, of course be taken to provide for drainage, and the surface of the earth should be well compacted by rolling or tamping.

While in the embodiment of the present invention involving the use of bitumens, solid or semi-solid at the ordinary temperatures, I have described liquefying such bitumen by heat and then mixing with the mud of earth and water, of course where such a bitumen is brittle enough it may be fine ground and mixed with the earthy matter prior to the addition of the water, the process otherwise being the same.

Another reason making the presence of volatile oils undesirable is that in the present invention the amount of bitumen relative to earth is made just that which will give a strong composition; and if the composition loses oils by evaporation it inevitably becomes porous and is no longer waterproof.

What I claim is:—

1. The process of making paving compositions which comprises producing an emulsion of asphalt, water and clayey earthy material, the amount of such asphalt being merely that which in conjunction with said earthy material will give a dense, hard and malleable composition and the amount of water being such as to permit free workability during incorporation.

2. The process of making paving compositions which comprises producing an emulsion of asphalt liquid at atmospheric temperatures, water and clayey earthy material, the amount of such asphalt being merely that which in conjunction with said earthy material will give a dense, hard and malleable composition and the amount of water being such as to permit free workability during incorporation.

3. The process of making paving compositions which comprises producing an emulsion of asphalt, water and clayey earthy material, the amount of such asphalt being merely that which in conjunction with said earthy material will give a dense, hard and malleable composition and the amount of water being such as to permit free workability during incorporation, agitation and disintegration of asphalt and earthy matter in the presence of water being continued until the asphalt and earthy matter are reduced to fine associated particles, and thereafter removing the water.

4. The process of making paving compositions which comprises producing an emulsion of asphalt liquid at atmospheric temperatures, water and clayey earthy material, the amount of such asphalt being merely that which in conjunction with said earthy material will give a dense, hard and malleable composition and the amount of water being such as to permit free workability during incorporation, agitation and disintegration of asphalt and earthy matter in the presence of water being continued until the earthy matter is reduced to fine particles and the liquid asphalt thoroughly incorporated therewith, and thereafter removing the water.

5. The process of making paving compositions which comprises producing an emulsion of asphalt, water and clayey earthy material, the amount of such asphalt being merely that which in conjunction with said earthy material will give a dense, hard and malleable composition and the amount of water being such as to permit free workability during incorporation, agitation and disintegration of asphalt and earthy matter in the presence of water being continued until the asphalt and earthy matter are reduced to fine associated particles, and applying the composition thus obtained to a roadway and compacting it in place.

6. The process of making paving compositions which comprises producing an emulsion of asphalt liquid at atmospheric temperatures, water and clayey earthy material, the amount of such asphalt being merely that which in conjunction with said earthy material will give a dense, hard and malleable composition and the amount of water being such as to permit free workability during incorporation, agitation and disintegration of asphalt and earthy matter in the presence of water being continued until the earthy matter is reduced to fine particles and the liquid asphalt thoroughly incorporated therewith, and applying the composition thus obtained to a roadway and compacting it in place.

7. As a new composition of matter adapted for paving and other purposes, a liquid composition of clayey earthy matter and bitumen, the amount of bitumen relative to said clayey matter being merely that which will suffice to make the composition when dry, hard, malleable and poreless.

8. As a new composition of matter adapted for paving and other purposes, a composition of clayey earthy matter and bitumen liquid at normal temperatures, the amount of bitumen relative to the earthy matter being merely that which will suffice to make the composition hard, malleable and poreless when dry, said clayey earthy matter and liquid bitumen being so intimately incorporated as to give a substantially homegeneous composition so far as concerns said earthy matter and bitumen.

In testimony whereof, I affix my signature hereto.

MICHAEL A. POPKESS.